(12) United States Patent
Schloss

(10) Patent No.: US 6,270,684 B1
(45) Date of Patent: Aug. 7, 2001

(54) HIGH PERFORMANCE COMBINED SEWAGE OVERFLOW AND WATER INTAKE SCREEN

(75) Inventor: Charles M. Schloss, Englewood, CO (US)

(73) Assignee: Schloss Engineered Equipment, Inc., Aurora, CO (US)

( * ) Notice: Subject to any disclaimer, the term of this patent is extended or adjusted under 35 U.S.C. 154(b) by 0 days.

(21) Appl. No.: 09/501,068

(22) Filed: Feb. 9, 2000

(51) Int. Cl.$^7$ ..................................................... B01D 37/00
(52) U.S. Cl. ..................... 210/784; 210/791; 210/391; 210/396; 210/402; 210/408; 210/157; 210/158
(58) Field of Search ..................... 210/157, 158, 210/159, 784, 791, 402, 780, 767, 391, 396, 407, 408, 154

(56) References Cited

U.S. PATENT DOCUMENTS

| | | | | |
|---|---|---|---|---|
| 630,769 | * | 8/1899 | Bird | 210/157 |
| 788,511 | * | 5/1905 | Besseberg | 210/157 |
| 951,635 | * | 3/1910 | Erekson | 210/157 |
| 971,492 | * | 9/1910 | Collar | 210/157 |
| 1,092,440 | * | 4/1914 | Guiu | 210/157 |
| 1,109,385 | * | 9/1914 | Allison | 210/157 |
| 1,276,374 | * | 8/1918 | Keller | 210/157 |
| 1,412,230 | * | 4/1922 | Cuttle | 210/157 |
| 2,223,104 | * | 11/1940 | Hansen | 210/157 |
| 2,240,642 | * | 5/1941 | Durtschi | 210/157 |
| 2,328,297 | * | 8/1943 | Roberts | 210/157 |
| 5,676,829 | * | 10/1997 | Cotterill | 210/159 |
| 5,779,887 | * | 7/1998 | Rector et al. | 210/159 |

\* cited by examiner

*Primary Examiner*—Robert Popovics
(74) *Attorney, Agent, or Firm*—Gibson, Dunn & Crutcher LLP

(57) ABSTRACT

A screening device useful in water and waste water treatment plants separates fluid flow into two streams. The screening device is perforated so that solids having a predetermined cross-section will be maintained within a first fluid stream, and a portion of the fluid flow that has been screened of solids will flow into a second split-off fluid flow. The streams may go to different locations; only the first stream need be processed for the solids. The screening device is preferably cylindrical or another surface of rotation or a section of such a surface, and rotates. These features help maintain the screening device free of solids, and supplemental cleaning devices may also be used.

13 Claims, 2 Drawing Sheets

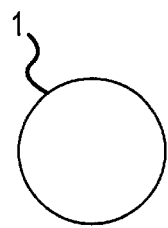
FIG.2A    FIG.2B    FIG.2C
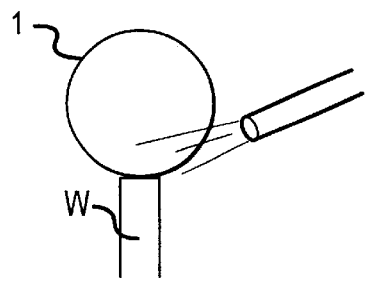
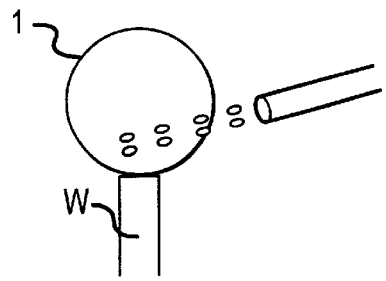
FIG.3A    FIG.3B
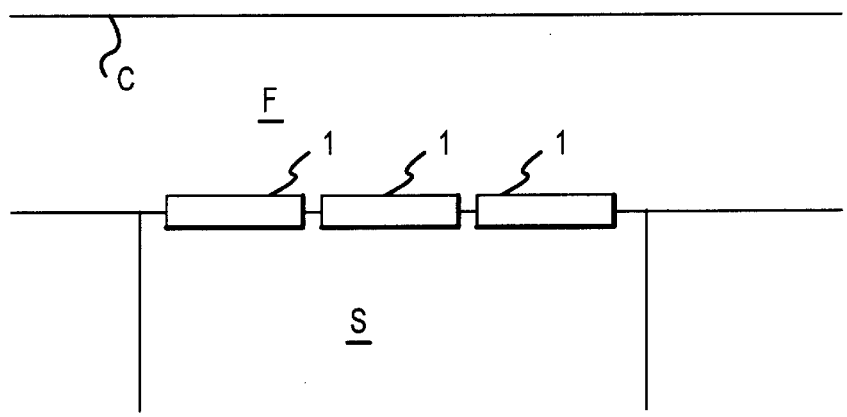
FIG.4

HIGH PERFORMANCE COMBINED SEWAGE OVERFLOW AND WATER INTAKE SCREEN

FIELD OF THE INVENTION

The present invention relates to the field of screening equipment such as equipment used in water or waste water treatment plants.

BACKGROUND

In some older sewage collection systems, for example as may found in the Eastern United States, Europe, and elsewhere, the sewage collection pipe or channel network was designed to collect sanitary sewage so that sewage transporting fecal matter and the like as well as intercept storm water is collected from streets, manholes and other sources. This storm water sometimes causes hydraulic flows to the sewage treatment plants in excess of their capacity to treat or dispose of the incoming fluid.

Some municipalities or pseudo-municipal districts have undertaken the expense of excavation and replacing these collection systems and separating the flows of sanitary sewage from storm water flows. However, this has substantial expense both in financial cost and inconvenience to the local population caused by the performance of such work. Accordingly, it is desirable to have some means to handle excess water flow systems having both sanitary waste and storm water.

There are devices now offered to intercept the larger solid material contained in such combined flows, while diverting the transporting liquid component of the flow. The liquid component will in general contain urine and finely divided solids. Still, it will be highly diluted by the storm water so that its environmental impact on a subsequent receiving body of water may be acceptable. These existing devices suffer from various problems such as vulnerability to jamming by tree branches or other large or bulky solids, blinding by solids due to relatively low cleaning water momentum, mechanical complexity and reliability issues, and operator maintenance intensity and risk exposure such as removal of net bags.

A similar and related problem exists where liquid from a body of surface water such as a river must be collected for subsequent use (i.e., a water treatment application or cooling water application as opposed to the above-described waste water application). It may be desirable to separate the trash from a quantity of the liquid without completely removing the trash from the liquid body.

Existing water intake screens used for the water treatment application suffer from difficulties similar to those for the preexisting solid intercept devices. Further, it may be difficult to meet governmental requirements regarding the subsequent disposal of the solids, i.e., trash, removed from the water.

Thus, it can be appreciated that a device solving the above-described problems would be a welcome advance in the art.

SUMMARY

The present invention relates to a method for screening solid objects from a fluid stream such as an intake stream to waste water plant or a water treatment facility. The method includes the steps of filtering a portion of the fluid stream through a screening device into a split-off stream using a screening device that is a perforated non-planar surface, and moving the screening device to assist in maintaining the screening device clear of solids. The moving may include rotation of the screening device. In a preferred embodiment, the screening device is a perforated drum, or more generally is a partial or complete surface of revolution.

The method may also include the step of cleaning the screening device, although the design of the screening device assists in maintaining the device clear of obstructions even without any additional cleaning. A number of screening devices can be used together to obtain the desired capacity.

The invention also includes structure to perform the described method.

BRIEF DESCRIPTION OF THE DRAWINGS

FIGS. 2A, 2B, and 2C are sectional views of alternative shapes of the screening device according to aspects of the present invention.

FIGS. 3A and 3B are schematic views of supplemental cleaning devices according to aspects of the present invention.

FIG. 4 is a schematic view of an embodiment of the invention using more than one screening device.

DETAILED DESCRIPTION

Figure 1:
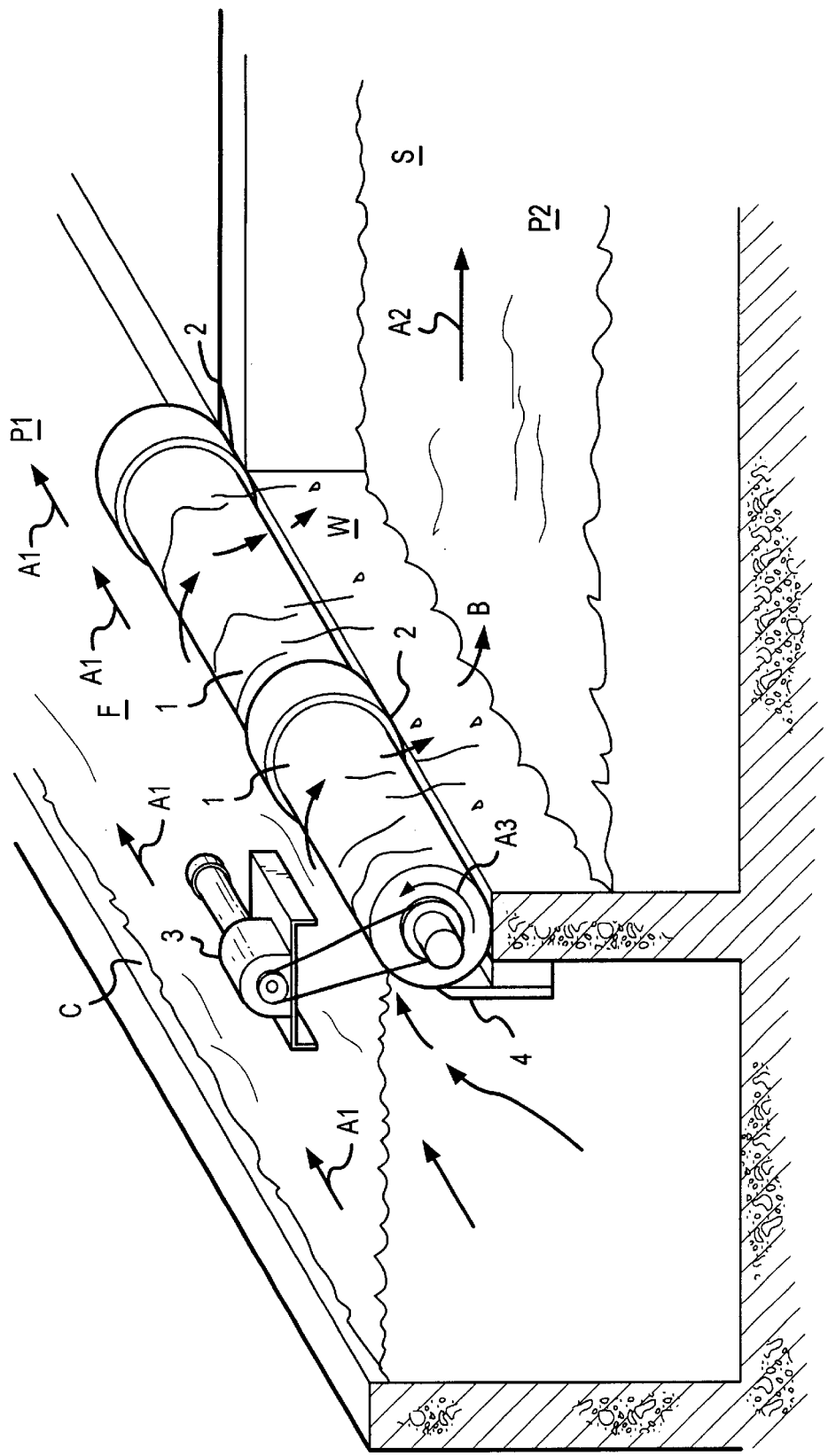
FIG. 1 is a perspective view of an embodiment of the invention in use in a typical application.

The invention is useful for treating a fluid flow that contains solids. The fluid flow is separated into a component that is free of solids and into a component that contains solids. These two separate fluid flows may be treated as desired. For example, the device may be useful in connection with treating waste water that contains solids such as fecal matter that must be specially treated. Some of the water can be filtered out and disposed of separately from the solids. Or, it may be desirable to treat a body of surface water such as a river for subsequent use including separating solids (e.g., trash) from a portion of the body of surface water.

An embodiment of the invention used in a typical application is illustrated in connection with FIG. 1. A fluid flow F having a flow direction indicated by arrows A1 is contained within a channel C. A split-off flow S having a flow direction indicated by arrows A2 is in fluid communication with fluid flow F, and is separated from the fluid flow F by a vertical weir wall W. The weir W forms a part of channel C. The channel C is representative of any fluid containing structure, such as a pipe. The weir wall W is representative of any means for at least partially separating two fluid flows.

A screening device 1 is situated on weir W so that all fluid that passes from fluid flow F into split-off flow S must pass through the screening device 1. The screening device 1 is preferably cylindrical in shape, or it may be another surface of revolution or a portion of a surface of revolution, or more generally any other shape that is "non-flat", i.e., non-planar. In FIG. 2A, a cross-section of screening device 1' is shown. In FIG. 2B, a cross-section of an alternate screening device 1" is shown, wherein a partial cylinder is used. In FIG. 3C, an alternate screening device 1 has a cross-section that is a partial surface of rotation of a shape such as a parabola.

The screening device 1 is perforated or otherwise fluid permeable so that fluid in fluid flow F that contacts screening device 1 can flow through the screening device 1 into the split-off flow S. By way of example, the screening device 1 may have a covering layer of material such as wedge wire screen, perforated metallic or non-metallic sheet, or woven membrane. The perforations (which as used herein includes any other fluid permeable separations) of screening device 1 are such that fluid may flow through the screening device, but solid objects having a particular cross-section (dependent upon the construction of the screening device 1) are retained by the screening device. A substantially rigid construction of the screening device 1 provides a more robust design for resisting failures due to sudden hydraulic differential pressure due to head loss from blinding.

The screening device 1 is preferably supported on the weir W by supports 2. The supports 2 may be any device which allows the screening device 1 to move on top of the weir W as described below. As can be seen, the configuration of the weir W and supports 2 is preferably such that there is a hydraulic difference in the fluid levels of the fluid flow F and split-off flow S.

A motor 3 (or other drive means) rotates or oscillates screening device 1 in the direction shown by arrow A3. The direction could also be opposite the direction shown by arrow A3. The screen could rotate in one rotational direction, or it could oscillate in the sense that it may first move in one rotational direction, then in the other. Movement in either one or both directions is encompassed by the term "rotation" herein. In a broader aspect of the invention, the motor 3 moves the screening device 1 in any direction or combination of directions, such as in a direction parallel to the axis of the screening device and/or perpendicular to the axis, in addition to or instead of the rotation.

The purpose of the rotation is to keep the screening device 1 clear of solid material that may otherwise accumulate on it. The combination of the non-planar shape and the rotation of the screening device 1 is more effective in keeping the device 1 clear of solids than known designs. The cleaning may be assisted by the force of fluid flowing through the cross-section of the screening device 1, and also the force due to fluid flowing through the upper portions of the screening device and impacting on lower portions of the device.

An optional aspect of the invention is an additional cleaning device 4 which can be a cleaning blade, "doctor blade" brush, or other means. Cleaning device 4 need not be discussed in detail, as such devices to clean screens in fluid treatment plant applications are well known. Other cleaning means include, but are not limited to, air nozzles (see FIG. 3A) or a liquid spray system (see FIG. 3B). The structures of FIGS. 3A and 3B are shown schematically, as such devices are known to clean screening devices and any such device could be used. The cleaning means could be operated continually, periodically, or aperiodically.

In FIG. 1, the axis of the screening device 1 is parallel to the centerline of the fluid channel C. However, in other embodiments the axis could be at any other angle, and may be used with a curved channel C.

One screening device 1 is shown in FIG. 1. In other embodiments, more than one screening device 1 could be used to provide sufficient hydraulic capacity. In FIG. 4, three screening devices 1 are used to filter fluid in fluid stream F, a portion of which flows into split-off flow S.

In a typical application, fluid flow F leads to a treatment plant P1 suitable for treating the solids contained within fluid flow F, and split-off flow leads to a bypass plant P2 (or any fluid repository such as a body of water) that need not be suitable for treating the solids that are screened by the screening device 1.

In the case of an extreme storm event or other where the incoming flow is in excess of the combined capacity of the sewage treatment plant P1 and the screening device 1, the flood water will over-top the screening device, like a broad crested weir and be delivered away from the plant.

The operation of the invention can be readily understood from the above description. In an embodiment, fluid flow F may normally flow through the channel C at a level such the flow is below the screening device 1 and none of the water is diverted into split-off flow S. Once the fluid flow F reaches a certain level, a portion of the flow will be directed through the screening device 1 into the split-off flow S. All of the solids (having cross-sections larger than the perforations in screening device 1) will be retained in fluid flow F and may be treated by the suitable treatment plant P1.

It will be appreciated that a number of features are described herein, and none of them should be considered essential to the practice of the invention, as subcombinations of the disclosed features are also useful. It will also be appreciated that while a presently preferred embodiment has been described, modifications may be obvious to those skilled in the art, and the preferred embodiment described herein should be construed in an illustrative, and not a limiting, sense.

What is claimed is:

1. A method for screening solid objects from a fluid stream having a direction of flow, comprising:

filtering a portion of the fluid stream through a screening device into a split-off stream having a direction of flow different from the fluid stream direction of flow, the screening device being substantially circular in cross section, and the screening device having an upper section; and moving the screening device to assist in maintaining the screening device clear of solids, said means rotating the screening device so that the upper section of the screening device is rotated opposite the split-off stream direction of flow;

wherein the screening device has an axis that is parallel to the fluid stream direction of flow.

2. The method of claim 1, wherein the screening device is a perforated drum.

3. The method of claim 1, further comprising the step of cleaning the screening device with a separate cleaning device.

4. The method of claim 3, wherein the cleaning step uses a component selected from the group consisting of a blade, a doctor blade, a brush, an air nozzle, and a liquid spray system.

5. The method of claim 1, further comprising the step of directing the fluid stream to a treatment plant.

6. The method of claim 1, wherein the filtering step includes using a plurality of screening devices.

7. A system for treating a fluid flow stream containing solids having at least a preselected cross-section, comprising:

a channel for containing the fluid flow stream having a direction of flow;

a screening device for screening at least a portion of the fluid flow stream into a split-off stream having a direction of flow different from the fluid stream direction of flow, the screening device being perforated so that solids having at least the preselected cross-section will be maintained within the fluid flow stream, the screening device having a substantially circular cross section, and the screening device having an axis that is parallel to the fluid stream direction of flow;

the screening device having an upper section; and means for moving the screening device, said means rotating the screening device so that the upper section of the screening devices is rotated opposite the split-off stream direction of flow.

8. The system of claim 7, wherein the screening device is a perforated drum.

9. The system of claim 7, further comprising a cleaning device for cleaning the screening device.

10. The system of claim 9, wherein the cleaning device is selected from the group consisting of a blade, a doctor blade, a brush, an air nozzle, and a liquid spray system.

11. The system of claim 9, further comprising a treatment plant for the fluid flow stream.

12. The system of claim 7, further comprising a plurality of screening devices.

13. The system of claim 7, wherein the channel has a fluid capacity such that when the fluid stream is below the capacity no fluid is diverted into the split-off stream and when the fluid is at or above the capacity at least some fluid is diverted into the split-off stream.

* * * * *